(12) United States Patent
Denteneer et al.

(10) Patent No.: US 8,724,650 B2
(45) Date of Patent: May 13, 2014

(54) MANAGEMENT OF ACCESS TO A MEDIUM

(75) Inventors: Theodorus J. J. Denteneer, Eindhoven (NL); Guido R. Hiertz, Aachen (DE); Bernhard Walke, Eindhoven (NL); Peter M. Van de Ven, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 482 days.

(21) Appl. No.: 12/676,651

(22) PCT Filed: Sep. 4, 2008

(86) PCT No.: PCT/IB2008/053577
§ 371 (c)(1),
(2), (4) Date: Mar. 5, 2010

(87) PCT Pub. No.: WO2009/034503
PCT Pub. Date: Mar. 19, 2009

(65) Prior Publication Data
US 2011/0206016 A1  Aug. 25, 2011

(30) Foreign Application Priority Data
Sep. 14, 2007 (EP) .................................... 07301368

(51) Int. Cl.
*H04J 3/18* (2006.01)
(52) U.S. Cl.
USPC ........................................................... 370/447
(58) Field of Classification Search
None
See application file for complete search history.

(56) References Cited

U.S. PATENT DOCUMENTS

| | | | |
|---|---|---|---|
| 4,688,213 A * | 8/1987 | Raychaudhuri | 370/348 |
| 6,055,578 A | 4/2000 | Williams et al. | |
| 7,027,462 B2 | 4/2006 | Benveniste | |
| 7,593,745 B2 * | 9/2009 | Shih | 455/522 |
| 2002/0152324 A1 | 10/2002 | Sherman | |
| 2004/0196871 A1 * | 10/2004 | Terry | 370/477 |
| 2005/0163150 A1 * | 7/2005 | Yang et al. | 370/445 |
| 2006/0274680 A1 | 12/2006 | Zhu et al. | |
| 2007/0124443 A1 * | 5/2007 | Nanda et al. | 709/223 |
| 2007/0127380 A1 * | 6/2007 | Abraham et al. | 370/235 |

FOREIGN PATENT DOCUMENTS

| | | |
|---|---|---|
| WO | 2004107680 A2 | 12/2004 |
| WO | 2006083565 A2 | 8/2006 |
| WO | 2007047757 A1 | 4/2007 |

OTHER PUBLICATIONS

Nait-Abdesselam et al: "Enhanced Routing-Aware Adaptive Mac With Traffic Differentiation and Smoothed Contention Window in Wireless Ad-Hoc Networks"; Proceedings of the 24th International Conference on Distributed Computing Systems Workshops (ICDCSW'04), 2004, 6 Page Document.
IEEE Standard 802.11,Version D1.06:"Local and Metropolitan Area Networks-Specific Requirements"; 2007, Sections 9.2.3, 9.2.10 and 9.9.1.3; pp. 258-271, 287-289.

* cited by examiner

Primary Examiner — Anh-Vu Ly

(57) ABSTRACT

The present invention relates to, in a wireless network in which wireless stations transmit frames, a method of managing the access of the medium to a wireless station once a frame or a sequence of frames has been transmitted by the wireless station, the method comprising: (a) generating a time value resulting from a function of the duration of the frame or the sequence of frames to be transmitted, —(b) transmitting the frame or the sequence of frames; and (c) after step (b), the wireless station refraining from access to the medium by counting down a refraining time, the value of the refraining time being determined by taking account of the said time value.

14 Claims, 5 Drawing Sheets

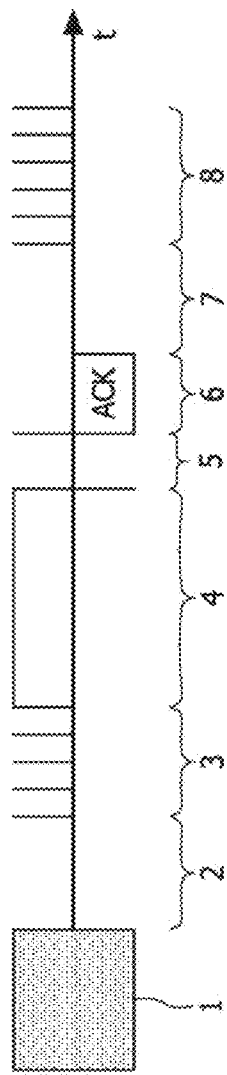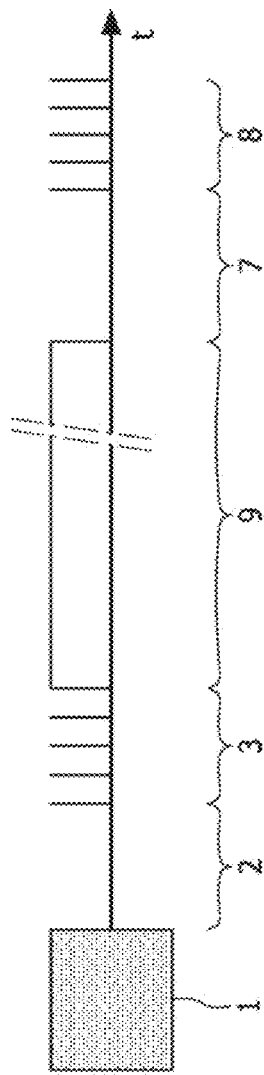
FIG. 1
PRIOR ART
FIG. 2
PRIOR ART

MANAGEMENT OF ACCESS TO A MEDIUM

FIELD OF THE INVENTION

The invention relates to a method for managing access of a wireless medium in a wireless network. The invention is particularly relevant to wireless local area networks (WLAN), in particular meshes type of WLAN based on the IEEE 802.11s standard.

BACKGROUND OF THE INVENTION

The IEEE 802.11s standardization committee group is currently working on an extension of the 802.11 standard for meshes. The current IEEE 802.11s standard specification, version D1.06, incorporated herein by reference, defines an IEEE 802.11 WLAN using the IEEE 802.11 Medium Access Control/Physical (MAC/PHY) layers that support both individually addressed and group addressed delivery over self-configuring multi-hop topologies. Mesh networks according to the 802.11s standard, or so-called meshes, operate as wireless co-operative communication infrastructures between numerous individual wireless transceivers.

Stations or mesh points (MP) define nodes in the mesh that communicate with their neighboring adjacent nodes only.

MPs thus act as repeaters to transmit message data from nearby nodes to peers that are too far to reach.

More generally, in wireless communication systems, transmissions are vulnerable to collisions as frames may be transmitted simultaneously. Therefore systems are usually built in with a number of preventive measures to reduce the number of collisions.

Examples from the IEEE 802.11 standard include Carrier Sense Multiple Access with Collision Avoidance (CSMA/CA) and the Request To Send/Clear To Send (RTS/CTS) virtual carried sense protocols.

In particular, the CSMA/CA protocol is designed for reducing the collision probability between multiple stations accessing a medium at the points where collisions would most likely occur.

To this purpose, and for a station to transmit, the method of the CSMA/CA protocol senses the medium to determine the state of the medium (i.e. if another station is transmitting), by using physical (provided by the PHY) and virtual (provided by the MAC) carrier-sense functions. When either function indicates a busy medium, the medium shall be considered busy; otherwise, it shall be considered idle.

If the medium is determined to be busy, the station shall defer its transmission until the end of the current transmission.

After deferral, or prior to attempting to transmit again immediately after a successful transmission, the station selects a random backoff interval and decrements the backoff interval counter while the medium is idle.

Such a random backoff procedure is necessary to resolve potential transmissions collisions on the medium that could occur after a busy time. There is indeed a high probability of a collision at this time, since multiple stations could have been waiting for the medium to become available during the busy time. Therefore, if several stations compete to access the medium, it is the station having the shortest random time that is allowed to access the medium. The other stations must therefore defer their transmission.

This backoff procedure allows thus a station to randomly own the access to the medium after a random time of time.

Moreover, the backoff procedure suspends the random backoff time whenever the medium becomes busy. It is resumed as soon as the medium is idle again.

If the medium is idle after the random time, the station may then initiate a frame or a sequence of frames exchange. It is to be noticed that a "sequence of frames" is for example built from a fragmentation of an initial MAC data unit into a sequence of smaller MAC level frames separately transmitted or come from independent burst of independent frames.

Additionally, the CSMA/CA protocol ensures that a gap of a minimum specified duration exists between contiguous frames.

To this purpose, the CSMA/CA provides fixed deferral times known as Interframe Spaces (IFSs) between frames or sequences of frames and/or before starting the backoff procedure—see Section 9.2.3. of the IEEE 802.11-2007 standard incorporated herein by reference. The durations of the IFSs are predetermined fixed by the PHY—see Sections 9.2.10 and 9.9.1.3 of the 802.11-2007 standard incorporated herein by reference.

Some examples of IFSs as defined in the IEEE 802.11 standard are given below.

The Short IFS (SIFS) is a fixed time interval from the end of the last symbol of a previous frame to the beginning of the first symbol of the preamble of the subsequent frame. A SIFS is typically used for separating two successive data frames of a sequence of frames, or a received data frame from a RTS, CTS or ACK frame to transmit.

The Distributed coordination function IFS (DIFS) is a fixed time interval that a station waits once the medium is sensed to be idle after a correctly received frame. Once the DIFS elapsed and if the medium is still idle, the random backoff time is decremented.

The Extended IFS (EIFS) starts once the medium is sensed to be idle after a transmitted frame was not received correctly. The EIFS is defined to provide enough time for another station to acknowledge what was, to this station, an incorrectly received frame before this station commences transmission.

For a network which integrates in MAC procedures to support LAN applications with quality of service (QoS) requirements, an Arbitration IFS (AIFS) is also defined. It is to be noticed that, for complying with the QoS requirements, it is introduced a coordinator that performs bandwidth management including the allocation of transmission opportunities (TXOPs) to wireless stations. The TXOP is the duration during which the TXOP holder maintains uninterrupted control of the medium, and it includes the time required to transmit frames sent as an immediate response to the TXOP holder's transmission. A TXOP may particularly comprise at least one frame and a corresponding acknowledgment. Stations compete thus on TXOPs. The owner of a TXOP has the right to transmit one or more frames during TXOP. The AIFS is a fixed time interval that starts once the medium is sensed to be idle after a correctly received TXOP frame. Once the AIFS elapsed and if the medium is still idle, the random backoff time is decremented.

An example according to IEEE 802.11-2007 standard of an access management is given with reference to FIG. 1, wherein, after a time 1 during which the medium is busy, a fixed deferral time 2 (for example a DIFS) and a random backoff time 3 are successively counted down, until the transmitting station can transmit a frame 4 on the medium still idle. Then an acknowledgement "ACK" 6 is received by the transmitting station from a receiving station, after a pause 5. Once the acknowledgement "ACK" 6 is received, the transmitting station can start again the deferral 7 and backoff 8 procedures.

Another example according to IEEE 802.11-2007 of an access management is given with reference to FIG. 2, wherein, after a time 1 during which the medium is busy, a fixed deferral time 2 (for example AIFS) and a random backoff time 3 are successively counted down, until the transmitting station can transmit one or more frames during a time called TXOP 9 on the medium still idle. The duration of the frame(s) is equal to or less than the TXOP owned by the transmitting station. It is to be noticed that, according to this particular standard, the equivalent of "ACK" acknowledgement is contained in the TXOP. Once the station has transmitted its frames or the TXOP duration 9 has expired, the transmitting station can start again deferral 7 and backoff 8 procedures.

It is to be noticed that, in the case of mesh networks according to 802.11s draft standard, wherein a particular "Mesh Deterministic Access" (MDA) is used, the TXOP is called MDA TXOP (Mesh Deterministic Access TXOP). A station that has previously reserved a MDAOP according to 802.11s dradt standard, uses the said CSMA/CA and backoff procedures according to 802.11-2007 standard to obtain a MDA TXOP.

In spite of these known access control mechanisms, medium access problems are exacerbated in systems where the node density is high and where hidden nodes exist.

A prime example where such problems likely occur is in mesh networks, such as mesh networks complying with IEEE 802.11s drafted standard.

FIG. 3 depicts such a situation where, in a mesh wireless network, each station has different neighborhood. The network topology and the environment determine the amount of neighbors per station. Here, station "A" has a single neighbor—station "B". However, station "B" shares the wireless medium with four other stations ("A", "C", "D" and "E"). Due to its fewer amount of neighbors, "A" detects the wireless medium more often as idle than "B" since it is informed solely of the transmissions of its first neighbor. Thus, "A" can easily send more traffic to "B" than vice versa. Thus, station "A" can easily congest "B".

Accordingly, due to its opportunistic medium access, the 802.11 MAC provides a station at the edge of the network with higher share of capacity.

On the contrary, stations in the center are much more polled and become more quickly bottleneck to the network, as they forward the aggregated traffic of all attached stations.

This is especially problematic for wireless mesh networks in which stations density is particularly high.

As a consequence, an edge station can easily congests its neighbors and overload them with large amount of frames.

Higher layer protocols then need to detect frame loss and thereby limit the traffic.

SUMMARY OF THE INVENTION

A purpose of the invention is to overcome such problems of congestion in wireless networks. It is a further aim to perform such a decreasing of congestion by economic means and without drastically changing the existing systems.

The invention thus more particularly pertains, according to a first aspect, to a method of managing the access a medium from a wireless station, in a wireless network in which wireless stations transmit frames via the medium. The method comprising:
 (a) generating a time value resulting from a function of the duration of the frame or the sequence of frames to be transmitted;
 (b) transmitting the frame or the sequence of frames via the medium; and
 (c) after step (b), refraining the wireless station from transmitting another frame or sequence of frames via the medium meanwhile a refraining time is down counted, the value of the refraining time is determined by taking into account the said time value.

A method of the invention may in particular propose to refrain from access to the medium the wireless station for a refraining time that comprises a time duration (said time value) that comprises and/or is function of the duration of the previous transmitted data frame or sequence of frames.

Especially, the function may be chosen such that the time value increases with the duration of the frame or sequence of frames.

By transmitting a frame or a sequence of frames of a determinate size, and therefore occupying the medium during the corresponding time duration, the wireless station is thus "punished" by being prevented from transmitting a further frame or sequence of frames for a next duration which can be proportional to the previous frame or sequence of frames.

The method according to the invention penalises thus stations that are used to transmit more own frames than other stations.

In particular, the method according to the invention decreases the difference of share of capacity that can exist in a mesh network, especially between the stations at the edge of the network in view of the stations at the center of the network.

In a particular case, the invention may propose to fix said time value to the duration of the previous transmitted data frame or sequence of data frames.

In another particular case of the invention, the frame or sequence of frames transmitted by the wireless station was initially requested to be forwarded by at least one other wireless station.

It might be the transmitting wireless station that has requested the other station to forward the frame or sequence of frames.

By requesting other station(s) to forward data on behalf of it involves then a penalty for the transmitting station, by being refrained from access the medium for a time proportional to the size of the transmitted frame or sequence of frames.

Additionally, this provides the other station with sufficient capacity of the wireless medium for forwarding the frame or the sequence of frames without being penalised.

The invention provides therefore priority to forwarding stations and thus enables a cooperative behavior. While traditional 802.11 Mesh stations "transmit and forget", the proposed scheme helps the next station neighbor to forward the frame on behalf of the preceding station. Therefore, no additional congestion announcement is needed.

Additionally, the invention can be easily implemented. In particular, no major changes to existing hardware are needed.

According to a second aspect, the invention proposes a wireless station able to be an element of a wireless network, comprising:
 a transmitter for transmitting a frame or a sequence of frames into the wireless network;
 a timing processing unit for:
  generating a time value depending on the duration of the frame or the sequence of frames to be transmitted;
  down counting a refraining time including the time value; and
  refraining the wireless station to transmit another frame or sequence of frames onto the medium meanwhile the refraining time is down counted.

According to a third aspect, the invention proposes a wireless network comprising a plurality of the said wireless stations.

According to a fourth aspect, the invention proposes a computer program product for implementing the said method.

BRIEF DESCRIPTION OF THE DRAWINGS

The present invention will now be described in more detail, by way of example, with reference to the accompanying drawings, wherein:

FIG. 1 shows schematically how a transmitting station manages its medium access regarding the state of the medium, in compliance with known IEEE 802.11 standard.

FIG. 2 shows schematically how a transmitting station manages its medium access regarding the state of the medium, in compliance with known IEEE 802.11e standard.

DETAILED DESCRIPTION OF THE INVENTION

Although the present invention has been described in connection with the specified embodiments, it is not intended to be limited to the specific form set forth herein.

The particular embodiments hereafter described for illustrating the invention, relate to the control of a medium by wireless stations in a wireless network in which stations transmit frames or sequence of frames at intervals of time, e.g. regularly, timeically or untimeically. Examples of data frames to be transmitted are beacon transmissions or VoIP transmissions in reserved time slots.

The wireless station, the wireless network, the method or the computer program product used for transmitting the frames may or may not comply with IEEE 802.11-2007 standard or 802.11s draft standard D1.06, all incorporated herein by reference.

It is to be noticed that a "frame" as discussed below may be a data frame as defined in IEEE 802.11-2007 standard which is contained or not in a TXOP, or which is contained or not in a MDA TXOP as defined in IEEE 802.11s draft standard. The frame may also be a beacon frame. A "frame" as used herebelow may further comprise an acknowledgement frame, like a "ACK" frame.

FIGS. 4-7 illustrate four exemplary embodiments of medium control methods according to the invention, in order to transmit frames or sequences of frames from a transmitting wireless station "A" towards a receiving wireless station "B" via a medium through a wireless network.

Figure 3:
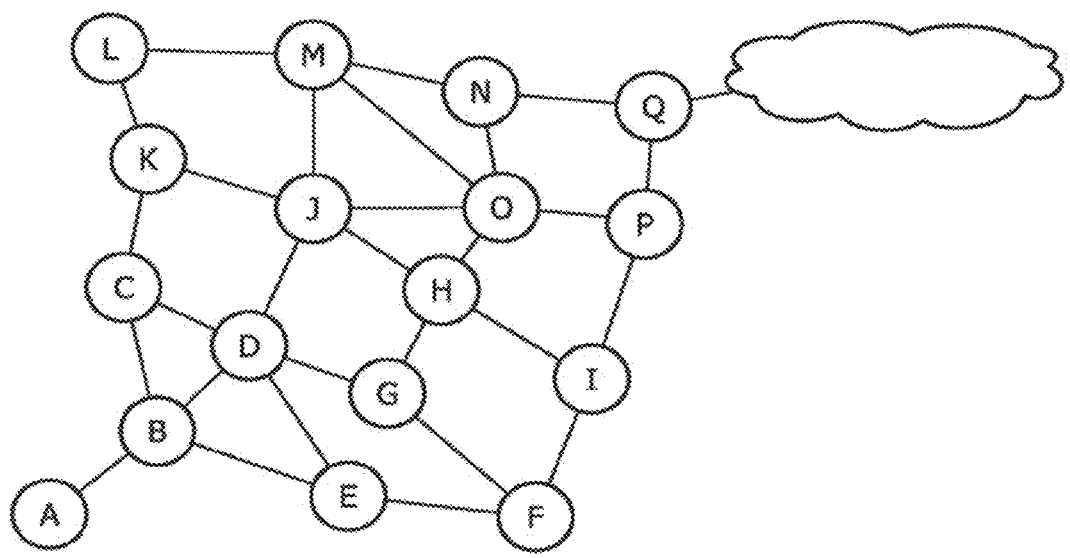
FIG. 3 shows an example of a mesh wireless network.
Figure 4:
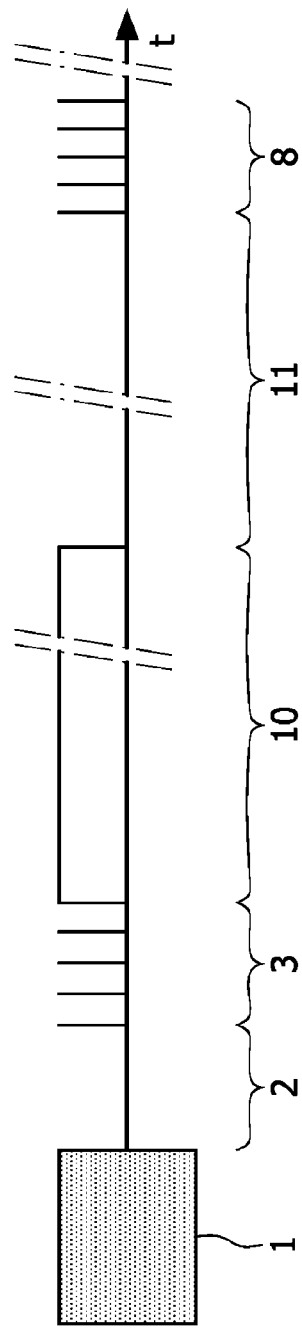
FIG. 4 shows schematically how a transmitting station manages its medium access regarding the state of the medium, according to a first embodiment of the invention.

FIG. 4 shows that after a time 1 during which the medium is busy, a fixed deferral time 2 (for example a DIFS, EIFS or AIFS) and a random backoff time 3 are successively counted down by a timer included in station "A". Then, the station "A" transmits a frame or a sequence of frames within a reserved time 10, e.g. a TXOP. The reserved time 10 has a size equal to "d". Once the frame or sequence of frames is transmitted, a refraining time is counted down by the timer. This refraining time comprises here two sub-times successively counted down: a first sub-time which is an uninterruptable fixed deferral time 11 generated so as to be equal to "d", this fixed deferral time 11 starting as soon as the medium is determined to be idle. This fixed deferral time 11 may be an IFS, such as a EIFS, DIFS or AIFS, having nevertheless a duration defined differently than those detailed in IEEE 802.11-2007 standard. Station "A" must detect the wireless medium as uninterruptedly idle for this fixed deferral time 11 to be allowed to transmit. When the medium becomes busy before the end of the deferral time 11 count down, the station stops and waits until the medium becomes idle again. Once the fixed deferral time 11 has expired, a typical backoff 8 procedure is started (which is the second sub-time). If the medium becomes busy before all slots of the backoff procedure are decremented, the station needs to wait again for an idle time as long as the deferral time 11.

Figure 5:
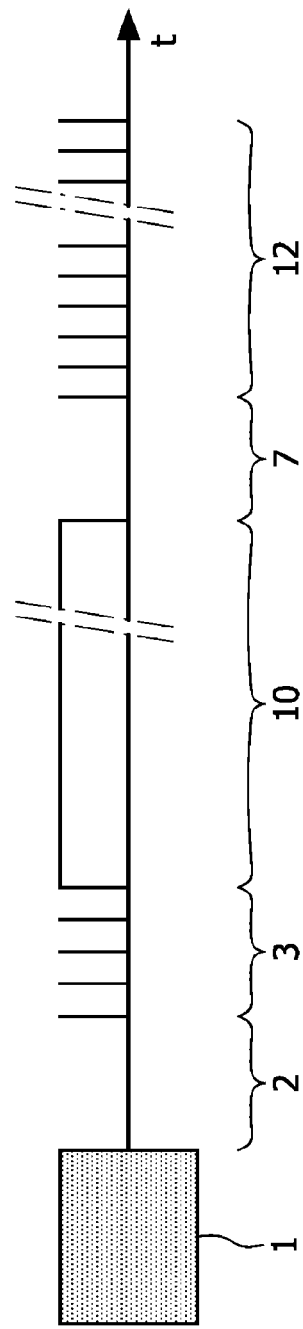
FIG. 5 shows schematically how a transmitting station manages its medium access regarding the state of the medium, according to a second embodiment of the invention.

FIG. 5 shows that, once a frame or a sequence of frames has been transmitted within a reserved time 10 of a size "d", a refraining time is counted down by a timer included in the station "A", this refraining time comprising here two sub-times successively counted down: a first sub-time which is a typical fixed deferral time 7 (e.g. a DIFS, EIFS or AIFS), which starts as soon as the medium is determined to be idle. Once the fixed deferral time 7 elapsed, a second sub-time is decremented. This second sub-time is a typical backoff time 12 enhanced by a number of slots equal to "d". This enhancement may be done by simply adding "d" to the backoff duration randomly calculated from a contention window or by adding "d" to the maximum value of the contention window before randomly calculating the backoff duration from the contention window.

Figure 6:
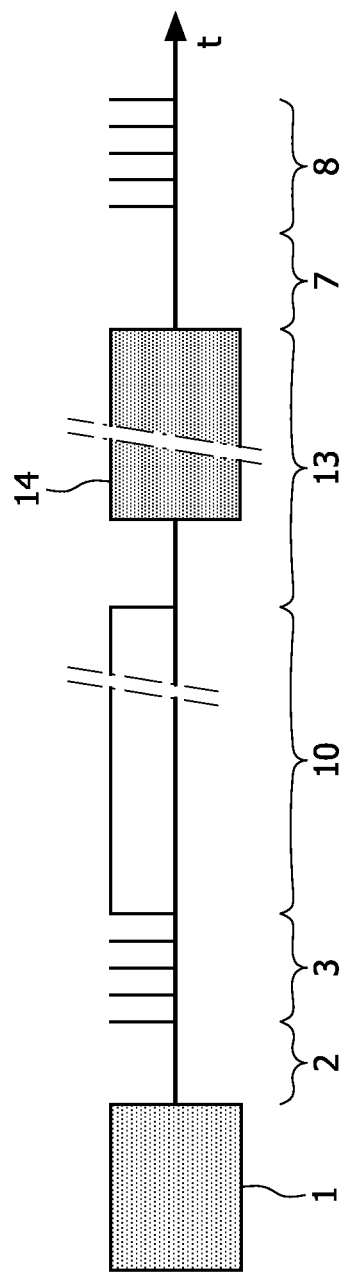
FIG. 6 shows schematically how a transmitting station manages its medium access regarding the state of the medium, according to a third embodiment of the invention.

FIG. 6 shows that, after station "A" has transmitted a frame or a sequence of frames within a reserved time 10 of a size "d", a refraining time is counted down by a timer included in the station "A", this refraining time comprising here three sub-times successively counted down: a first sub-time which is an uninterruptible fixed deferral time 13 generated so as to be equal to "d": even if the medium becomes busy or idle during a time 14, the fixed deferral time 13 continues to be counted down—i.e. the suspension timer of station "A" remains unaffected by the current state of the medium. Once this fixed deferral time 13 expired, typical fixed deferral time 7 (e.g. a DIFS, EIFS or AIFS) and/or backoff time 8 are successively counted down.

Figure 7:
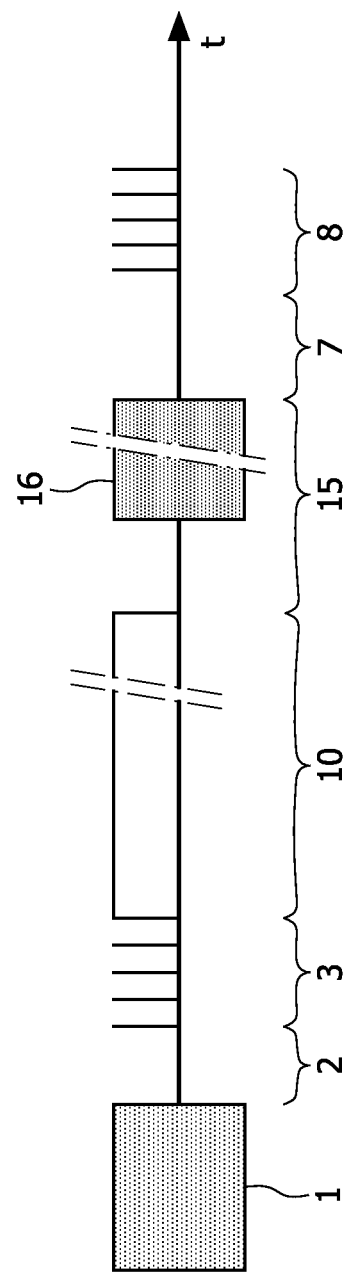
FIG. 7 shows schematically how a transmitting station manages its medium access regarding the state of the medium, according to a fourth embodiment of the invention.

FIG. 7 shows that, after station "A" has transmitted a frame or a sequence of frames within a reserved time 10 of a size "d", a refraining time is counted down by a timer included in the station "A", this refraining time comprising here three sub-times successively counted down: a first sub-time which is an interruptible fixed deferral time 15 generated so as to be equal to "d":

- if the medium becomes busy (16) during this fixed deferral time 15, the fixed deferral time stops and the station "A" may start to count down the next sub-time 7 (e.g. "DIFS" or "AIFS") that is followed by a random backoff time 8 after it detects the wireless medium as idle again.
- if the medium remains idle during this fixed deferral time 15, the fixed deferral time 15 expires, and typical fixed deferral time 7 (e.g. a DIFS, EIFS or AIFS) and/or backoff time 8 may be successively counted down after the wireless medium is detected as idle.

The access control according to one of the previous embodiments of the invention may be particularly relevant for mesh wireless networks, such as mesh wireless networks according to IEEE 802.11s draft standard.

In particular, a mesh wireless network of the invention may allow neighbor station "B" to forward the frame or the sequence of frames on behalf of station "A", for example under a request of station "A".

By refraining its access to the medium for a time value "d", station "A" allows station "B" to have sufficient capacity for forwarding the frame on behalf of station "A". Thus, by requiring station "B" to forward data involves a penalty for station "A" to transmit a further frame.

In a particular case, the said time value is down counted only if station "A" requests station "B" to forward the frame or the sequence of frames.

It is to be noticed that the invention is not limited to the case of a time value equal to the size "d" of the frame or the sequence of frames, but also relates to the case of time values calculated so as to be equal to the result of a predeterminated function of this size "d", such as the time value is proportional to or depends on "d".

It is to be noticed that the invention covers all kinds of wireless networks, complying with or without IEEE 802.11-2007 standard and its further amendments.

Figure 8:
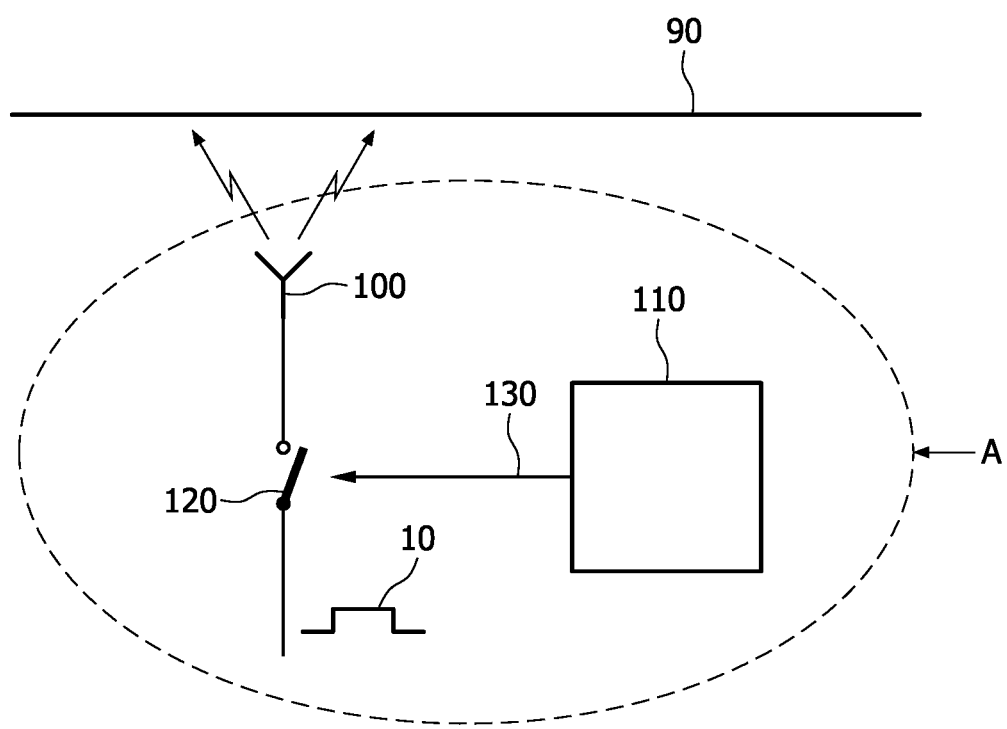
FIG. 8 shows schematically a station.

FIG. 8 shows schematically an example of a station "A" according to the invention comprising:
  a transmitter 100 for transmitting frames and/or sequences of frames into the wireless network via the medium 90;
  a timing processing unit 110 for:
    generating a time value depending on the duration of a first frame (or a sequence of frames)—not shown;
    counting down a refraining time including the time value; and
    refraining the wireless station to transmit a second frame 10 (or sequence of frames) onto the medium meanwhile the refraining time is down counted.

The generating of the time value may be carried out by a hardware and/or a software calculator that may implement a function, which inputs a signal representative of the duration of the said first frame and outputs the said time value. This operation may be done before the first frame has been transmitted (based on a measurement of the duration upon the stored first frame), during the transmission of the first frame (based on the counting of the duration of the transmission) or once the first frame has been transmitted (based on the measurement and/or the counting of the duration of the first frame).

The timing processing unit 120 may comprise means for generating a refraining time which takes into account the time value. This refraining time may be generated so as to include the time value and possibly some other kinds of refraining sub-times, such as a IFS and/or a backoff time. These different refraining sub-times are put in succession to form the said refraining time. Moreover, the timing processing unit 110 may be arranged for including the said time value in the refraining time only if the station "A" had previously requested another station to forward the first frame.

Once station "A" has transmitted the first frame (or sequence of frames) via the transmitter 110, the count down of the refraining time is triggered by the processing timing unit 120. The count down is implemented so as to be interrupted, once or several times, or not interrupted depending on the state of the medium and/or the embodiments of the invention that is implemented (see FIGS. 4-7 depicting four exemplary embodiments of to the invention). Meanwhile the count down is implemented, the station "A" must wait for transmitting the second frame 10.

Once the count down of the refraining time is ended and the medium is sensed to be idle, the station "A" transmits the second frame or sequence of frames 10 via the transmitter 100 onto the medium 90. This situation is schematically depicted by a switch 120 that is closed under a control signal (130) sent by the timing processing unit 110, allowing the second frame or sequence of frames 10 to be transmitted by station "A" on the medium.

Nevertheless, if the count down is interrupted because the medium is sensed to be busy or if the medium is sensed to be busy at the end of the count down, the transmission of the second frame or sequence of frames 10 is deferred to another time, and the timing processing unit 110 does not trigger the closing of the switch 120—i.e. the second frame or sequence of frames 10 is thus not transmitted on the medium.

Once the second frame or sequence of frames 10 has been transmitted, the timing processing unit 120:
  generates a time value depending on the duration of the second frame 10 (or sequence of frames);
  counts down a refraining time including the time value; and
  refrains the wireless station to transmit a third frame (or sequence of frames)—not shown—onto the medium meanwhile the refraining time is down counted.

The invention claimed is:

1. In a wireless network in which wireless stations transmit frames via a medium, a method of managing access to the medium from a wireless station, the method comprising:
  (a) generating a time value as a function of a duration of a transmission of a frame or a sequence of frames;
  (b) transmitting the frame or the sequence of frames via the medium; and
  (c) refraining transmitting a next frame or a next sequence of frames via the medium while a refraining time is down counted, the refraining time including said time value when the frame or sequence of frames is requested to be forwarded by at least another wireless station.

2. The method according to claim 1, wherein the function may be chosen such that the time value increases if the duration of the frame or sequence of frames increases.

3. The method according to claim 1, wherein the time value generated is substantially equal to the duration of the frame or the sequence of frames to be transmitted.

4. The method according to claim 1, wherein the refraining time being counted down as soon as the medium is determined to be idle.

5. The method according to claim 1, wherein the refraining time further includes a random backoff time.

6. The method according to claim 1, wherein the refraining time further includes a waiting time.

7. The method according to claim 1, wherein the refraining time includes a waiting time, the count down of the waiting time being interruptible as soon as the medium is sensed to be busy.

8. The method according to claim 6, wherein the refraining time further includes a fixed deferral time and a random backoff time, counted down after the count down of the waiting time.

9. The method according to claim 4, wherein a fixed deferral time is an IFS as defined in IEEE 802.11-2007 standard.

10. The method according to claim 5, wherein the random backoff time is defined in IEEE 802.11-2007 standard.

11. The method according to claim 1, wherein the wireless network is a mesh wireless network complying with IEEE 802.11s drafted standard.

12. A wireless station able to be an element of a wireless network, comprising:

a transmitter for transmitting a frame or a sequence of frames into the wireless network via a medium;

a timing processing unit for:

generating a time value depending on a duration of the frame or the sequence of frames to be transmitted;

counting down a refraining time, said refraining time including the time value; and refraining the wireless station from transmitting a next frame or a next sequence of frames onto the medium-while the refraining time is down counted, the refraining time including said time value when the frame or sequence of frames is requested to be forwarded by at least another wireless station.

13. A wireless network comprising a plurality of wireless stations, each of said wireless stations comprising:

a transmitter for transmitting a frame or a sequence of frames into the wireless network via a medium;

a timing processing unit for:

generating a time value depending on a duration of the frame or the sequence of frames to be transmitted;

counting down a refraining time, said refraining time including the time value; and refraining the wireless station from transmitting a next frame or a next sequence of frames onto the medium-while the refraining time is down counted, the refraining time including said time value when the frame or sequence of frames is requested to be forwarded by at least another wireless station.

14. A non-transitory, tangible computer medium including a computer program thereon, which when loaded into a wireless device causes the wireless device to implement a method comprising:

(a) generating a time value as a function of a duration of a transmission of a frame or a sequence of frames;

(b) transmitting the frame or the sequence of frames via the medium; and (c) refraining transmitting a next frame or a next sequence of frames via the medium while a refraining time is down counted, the refraining time including said time value when the frame or sequence of frames is requested to be forwarded by at least another wireless station.

* * * * *